(12) United States Patent
Hung

(10) Patent No.: US 6,583,820 B1
(45) Date of Patent: Jun. 24, 2003

(54) CONTROLLING METHOD AND APPARATUS FOR AN ELECTRONIC CAMERA

(75) Inventor: Po-Chieh Hung, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/039,419

(22) Filed: Mar. 16, 1998

(30) Foreign Application Priority Data

Mar. 17, 1997 (JP) .............................................. 9-063001

(51) Int. Cl.[7] ......................... H04N 5/225; H04N 5/247
(52) U.S. Cl. ....................................... 348/362; 348/364
(58) Field of Search ................................ 348/362–367, 348/221.1, 229.1, 224.1, 234, 672, 671, 673, 674, 687, 251, 254; 358/518, 521, 520, 519, 522, 3.01, 3.02, 3.06; 382/167–169, 274, 254, 255

(56) References Cited

U.S. PATENT DOCUMENTS

| | | | | |
|---|---|---|---|---|
| 4,956,718 A | * | 9/1990 | Numakura et al. | 358/3.06 |
| 4,982,290 A | * | 1/1991 | Nishi et al. | 348/223.1 |
| 5,194,960 A | * | 3/1993 | Ota | 348/362 |
| 5,221,963 A | * | 6/1993 | Hashimoto et al. | 348/229.1 |
| 5,677,733 A | * | 10/1997 | Yoshimura et al. | 348/362 |
| 5,748,802 A | * | 5/1998 | Winkelman | 382/169 |
| 5,778,260 A | * | 7/1998 | Sato et al. | 396/30 |
| 5,790,707 A | * | 8/1998 | Tanaka et al. | 382/274 |
| 5,940,530 A | * | 8/1999 | Fukushima et al. | 358/520 |
| 5,966,175 A | * | 10/1999 | Inoue | 348/364 |
| 5,974,190 A | * | 10/1999 | Maeda et al. | 382/274 |
| 6,061,091 A | * | 5/2000 | Van De Poel et al. | 348/364 |

FOREIGN PATENT DOCUMENTS

| | | | |
|---|---|---|---|
| JP | 07-288738 | * | 10/1995 |
| JP | 09-037145 | * | 2/1997 |

* cited by examiner

Primary Examiner—Aung S. Moe
(74) Attorney, Agent, or Firm—Finnegan, Henderson, Farabow, Garrett, & Dunner, L.L.P.

(57) ABSTRACT

A camera and a method of controlling the camera. The method includes the steps of: obtaining image signals from an image sensor by having the image sensor detect an image under a predetermined exposure amount; detecting luminance distribution condition of the image signals; and determining another exposure amount and a gradation characteristic for secondly obtaining image signals in relation to each other according to the previously detected luminance distribution condition.

18 Claims, 9 Drawing Sheets

CONTROLLING METHOD AND APPARATUS FOR AN ELECTRONIC CAMERA

BACKGROUND OF THE INVENTION

The present invention relates to a controlling technology for an electronic camera called a digital camera, and in particular, to a technology capable of making a whole image to be in an appropriate luminance.

There has recently been put to practical use an electronic camera which is of the structure wherein an optical image of a subject is focused on a solid image sensor (CCD) through an optical photographing system such as a photographing lens and an iris to be converted photoelectrically and outputted by the image sensor as electric image signals which are recorded on a recording medium.

In an ordinary automatic exposure control (hereinafter referred to as AE) of an electronic camera of the above-mentioned type, an iris and exposure time (hereinafter referred collectively to as exposure amount) are controlled so that a value obtained by integrating and averaging luminance signal levels of the whole image detected by the image sensor may be at an appropriate level.

In addition to that, there is also another one wherein luminance signal levels are integrated by making the weighting on the image central portion greater, and the value obtained from the integration is used to control an exposure amount.

However, in the ordinary method to use the value obtained by integrating and averaging luminance signal levels on the whole photographed image, when there is a portion of extremely high luminance on a part of an image, for example, the integrated value is influenced by that portion to be enhanced. Therefore, if the exposure amount is determined by using that average value as a standard, the image results in a dark one totally and a signal-to-noise ratio is also deteriorated. Further, a high luminance portion tends to be too luminous, resulting in a white washout image, because an exposure amount is determined to be matched to an average value of a high luminance portion and a low luminance portion.

In the case of the exposure control wherein an image central portion is weighted, too, when there is a portion of extremely high luminance in a highly weighted area, the problem mentioned above can not be solved.

Though there is further a method wherein an exposure amount is corrected by photographing several times and thereby the exposure is controlled so that a primary subject is in an appropriate luminance, it is sometimes impossible to make a portion other than the primary subject to be in an appropriate luminance, and in particular, it has been impossible for the exposure control alone to solve the aforesaid problem that a high luminance portion turns to be too luminous, resulting in a white washout image.

SUMMARY OF THE INVENTION

The invention has been achieved by paying an attention to the above-mentioned problems in the past, and an object of the invention is to make a primary subject to be in an appropriate luminance, to establish an optimum signal-to-noise ratio, to prevent that a high luminance portion turns to a white washout image, and thereby to obtain images with high image quality, in an electronic camera.

The above mentioned object is achieved by the camera and a method of controlling the camera.

The method includes the steps of: obtaining image signals from an image sensor by having the image sensor detect an image under a predetermined exposure amount; detecting luminance distribution condition of the image signals; and determining another exposure amount and a gradation characteristic for secondly obtaining image signals in relation to each other according to the previously detected luminance distribution condition.

The camera includes: an image sensor for converting image information to electric signals so as to obtain image data; a detector for detecting a luminance distribution of the image data; an exposure amount determination circuit for determining an exposure amount of photographing according to the luminance distribution; and a gradation characteristic determination circuit for determining a gradation characteristic of the image data in relation to the exposure amount of photographing.

Due to the arrangement stated above, by determining an exposure amount and a gradation characteristic so that they are properly correlated with each other, based on the luminance distribution condition of an image, it is naturally possible to make a primary subject to be appropriately luminous, and it is further possible to control so that a portion other than the primary subject is also made to be appropriately luminous, and a signal-to-noise ratio is also improved.

The controlling method or the apparatus for an electronic camera related to the invention makes an exposure amount determining means to determine an exposure amount to be smaller slightly when a difference of luminance in the luminance distribution condition of the image is great, and to determine the exposure amount to be larger slightly when the luminance difference is small, and it makes the gradation characteristic determining means to determine a gradation characteristic so that a high luminance portion is hardly saturated.

Due to the arrangement stated above, it is possible to reduce a high luminance portion in an image first by determining an exposure amount to be smaller slightly when a difference of luminance in the luminance distribution condition of an image is great, and it is possible to reduce frequency of occurrence of a white washout image by determining a gradation characteristic so that the high luminance portion is hardly saturated. Incidentally, making an exposure amount to be small makes a primary subject to be appropriately luminous in many cases usually without making it to be too luminous. However, when luminance of the primary subject is insufficient, it is possible to correct with a gradation characteristic so that the luminance on the primary subject may be enhanced.

On the contrary, when a difference of luminance in the luminance distribution condition of an image is small, an exposure amount is determined to be larger slightly, and thereby the luminance distribution is broadened to secure an appropriate contrast, and a signal-to-noise ratio is also improved. Even in this case, a gradation characteristic is determined so that a high luminance portion is hardly saturated to prevent occurrence of a white washout image, and when a primary subject is too luminous due to the increased exposure amount, it is possible to correct with a gradation characteristic so that the luminance of the primary subject may be lowered.

The controlling method or the apparatus for an electronic camera related to the invention is characterized in that an exposure amount determining means and a gradation characteristic determining means determine respectively an exposure amount and a gradation characteristic based on the luminance distribution condition of the image so that a luminance area with high frequency may represent the standard luminance.

Due to the arrangement stated above, it is possible to control a primary subject portion to be in appropriate luminance in many cases because the primary subject portion is usually intended to be photographed to be large in size and thereby it is highly probable that a luminance area with high frequency is a primary subject portion.

The controlling method or the apparatus for an electronic camera related to the invention is characterized in that an exposure amount determining means and a gradation characteristic determining means determine respectively an exposure amount and a gradation characteristic so that luminance on the central portion of an image may represent the standard luminance.

Due to the arrangement stated above, it is possible to control a primary subject portion to be in appropriate luminance in many cases because the primary subject portion is usually intended to be photographed to be large in size and to be located at the central portion and thereby it is highly probable that a luminance area with high frequency is a primary subject portion.

Further, the controlling method or the apparatus for an electronic camera related to the invention is characterized in that an exposure amount determining means and a gradation characteristic determining means determine respectively an exposure amount and a gradation characteristic so that average luminance of the whole image may represent the standard luminance.

Due to the arrangement stated above, it is possible to control the average luminance of the whole image appropriately.

Further, the controlling method or the apparatus for an electronic camera related to the invention is characterized in that a gradation characteristic is determined by a gradation characteristic determining means based on the luminance distribution condition of the image photographed again by the use of the exposure amount determined by the exposure amount determining means.

In the above-mentioned arrangement, it is possible to determine a gradation characteristic more accurately based on the luminance distribution condition of the image photographed actually using the exposure amount determined appropriately, and thereby to improve image quality sharply.

DETAILED DESCRIPTION OF THE INVENTION

Embodiments of the invention will be explained as follows.

Figure 1:
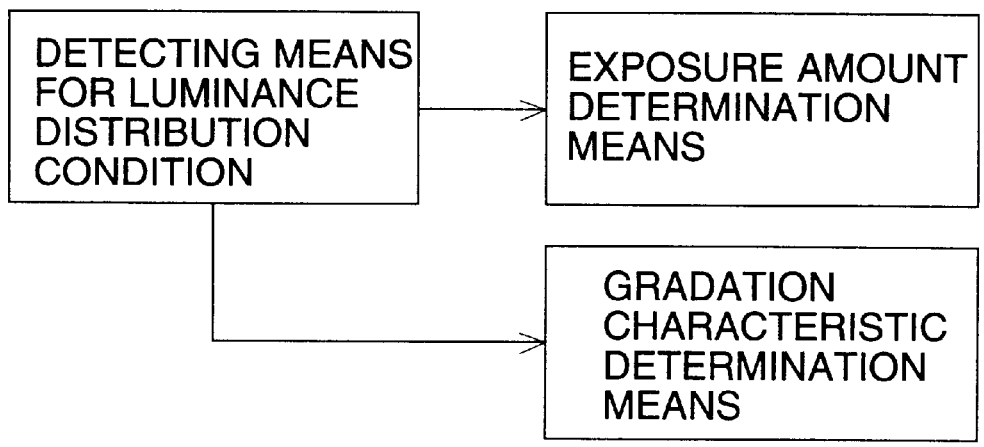
FIG. 1 is a block diagram showing constitution and function of the invention.
Figure 2:
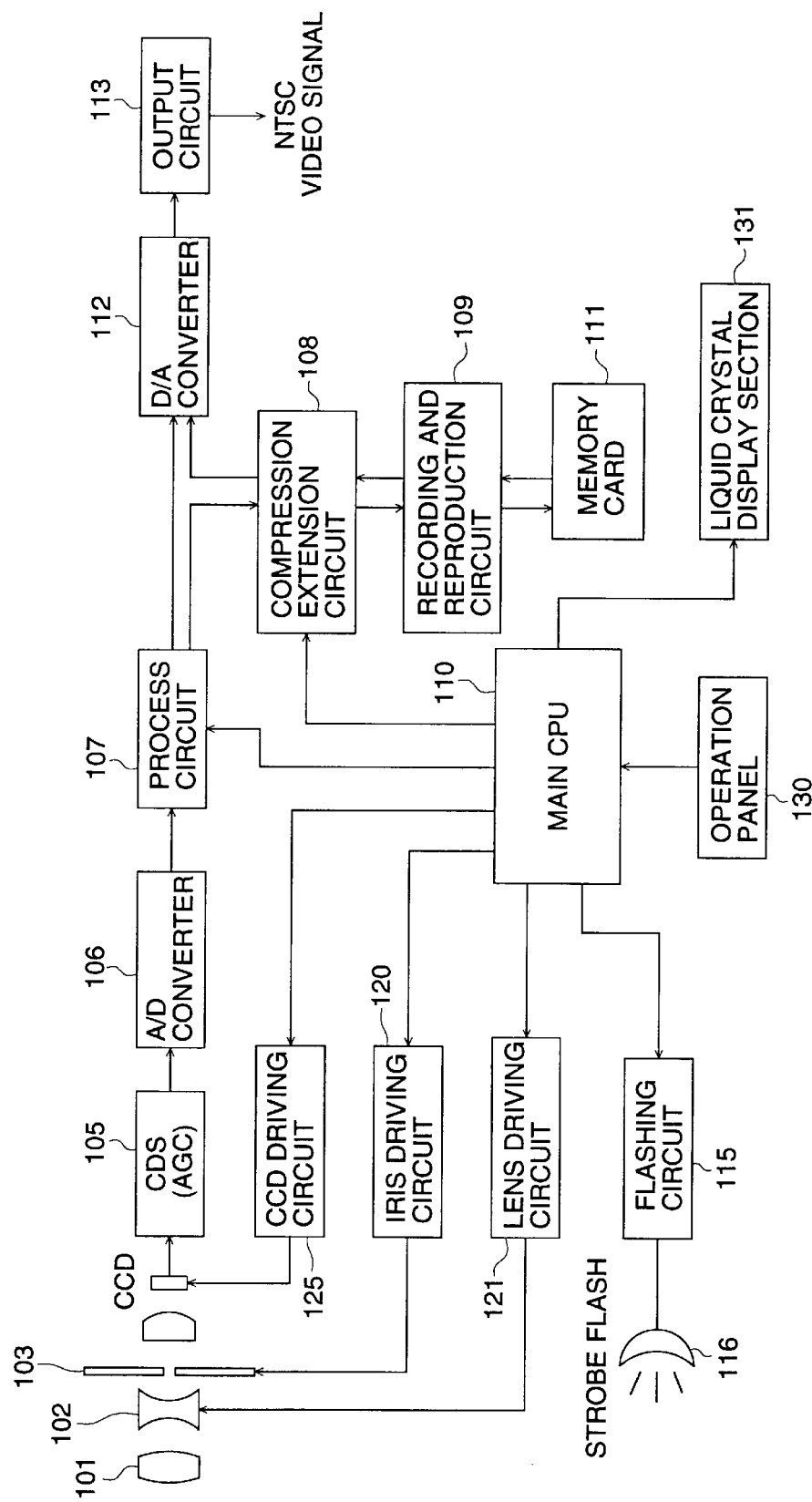
FIG. 2 is a block diagram showing hardware constitution of a still video camera related to an embodiment of the invention.

FIG. 2 shows hardware constitution of an electronic camera equipped with a controlling apparatus related to the invention.

In FIG. 2, an optical image of a subject obtained through an optical photographing system equipped with photographing lens 101, focusing lens 102 and iris 103 is focused on a solid image sensor, for example, on CCD 104. The focusing lens 102 and the iris 103 are driven respectively by lens driving circuit 121 and iris driving circuit 120.

In the CCD 104, the optical image focused thereon is converted into charge amount photoelectrically and is outputted as an analog electric image signal by the transmission pulse from CCD driving circuit 7. An analog electric image signal outputted from CCD 4 is subjected to reduction of its noise in a CDS (correlation double sampling) circuit, and is further subjected to adjustment of gains made by AGC. Then, the analog electric image signal is converted by A/D converter 106 into a digital image signal which is then subjected to luminance processing and color processing both conducted by process circuit 109 to be converted into a digital video signal (luminance signal and color difference signal). In this case, as the constitution related to the invention, preliminary photographing is conducted under prescribed conditions in the above-mentioned luminance processing, then, a distribution condition of digital values of luminance signals is detected, and an exposure amount and a gradation characteristic for photographing stated later are determined to be correlated with each other based on the luminance distribution condition, to conduct gradation processing of luminance signals based on the gradation characteristic. This will be stated in detail later.

Main CPU 110 controls operations of each section, and storobe flash 116 driven by flashing circuit 115 is controlled to flash when photographing is conducted.

Processes of AE (automatic exposure amount control), AWB (white balance adjustment) and AF (automatic focusing control) are conducted while being controlled by main CPU 110 which always uses data on the photographing plane. As constitution related to the invention, in this case, an exposure amount of the AE is determined as will be stated later based on the luminance distribution condition mentioned above. These processes are conducted when process circuit 107 supplies data, main CPU 110 conducts processing, and iris driving circuit 120, lens driving circuit 121, CCD driving circuit 125, and a color processing circuit in process circuit 107 are controlled. In addition, the main CPU 110 controls each section in accordance with how various switches (power supply switch, release switch, reproduction switch and so forth) on operation panel 130 are operated, and indicates necessary information on liquid crystal display section 131.

Incidentally, although the whole of a still video camera is controlled by main CPU 110 alone in the occasion stated above, it is also possible to arrange so that the control work is shared by a sub-CPU and a main-CPU.

When recording these digital video signals, data are compressed by compression extension circuit 108 and are recorded by recording and reproducing circuit 109 on memory card 111 composed of SRAM and flash memory.

In the case of reproduction, compressed data of digital video signals stored in the memory card 111 are read by the recording and reproducing circuit 109. Then, the compressed data are subjected to extension in the compression extension circuit 108 to be returned to digital video signals in the original size. Then, they are converted by D/A converter 112 into analog video signals which are outputted by output circuit 113 to external equipment as video signals at a prescribed level.

In the case of through reproduction, digital video signals are directly sent to D/A converter 112 from process circuit 107, and images photographed with CCD 104 keep to be outputted outside on a real time basis as video signals.

Next, processes to determine an exposure amount and a gradation characteristic executed by the main CPU 110 (or an unillustrated sub-CPU) will be explained.

Figure 3:
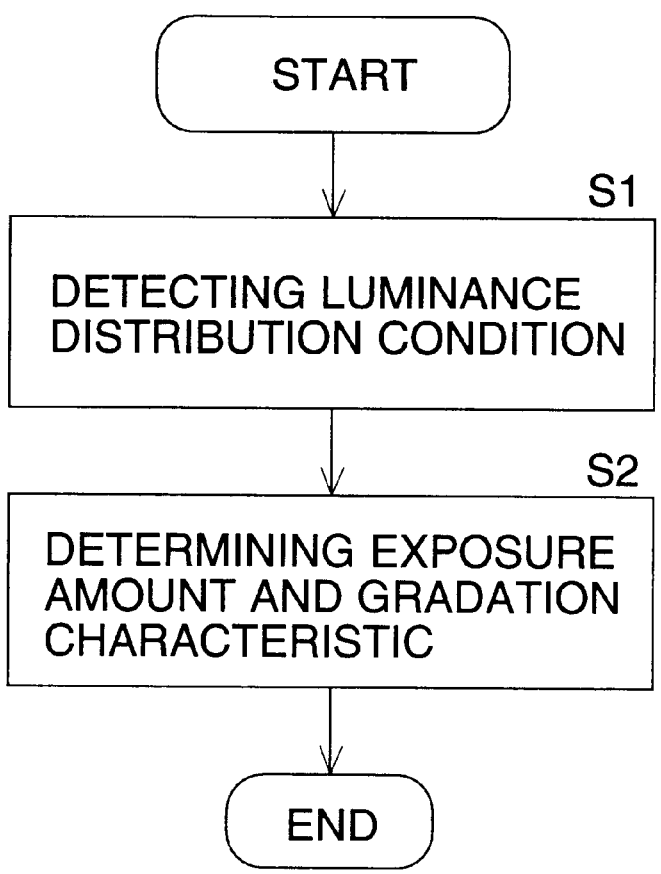
FIG. 3 is a flow chart showing determining process for an exposure amount and a gradation characteristic in the aforesaid embodiment.

FIG. 3 shows a flow chart of basic processes. In FIG. 3, a luminance distribution condition is detected in step 1 based on a digital value of a luminance signal for each pixel photographed under the prescribed condition including a condition of prescribed exposure amount (exposure time and iris). The luminance distribution condition represents a histogram or an accumulated histogram of a luminance or a specific color. To be concrete in the present embodiment, a histogram of 12-bit luminance digital value is prepared.

In step 2, an exposure amount (exposure time and iris) for photographing and a gradation characteristic are determined to be correlated with each other based on the luminance distribution condition mentioned above. Under the condition that (1) a median value in the gradation table is raised when reducing exposure, or (2) a median value in the gradation table is lowered when increasing exposure because of low contrast, or (3) exposure is set to be excessive slightly when a luminance difference or a contrast is low, "an exposure amount and a gradation characteristic are determined to be correlated with each other" means, for example, that a gradation curve is determined so that luminance which is higher than the standard may be obtained without converting to the standard luminance with the gradation curve, and that the gradation characteristic is changed for the specific characteristic depending on whether the exposure amount is raised to be higher than the prescribed value or lowered to be lower than that.

Next, there will be explained embodiments for determining an exposure amount and a gradation characteristic in the step 2.

Figure 4:
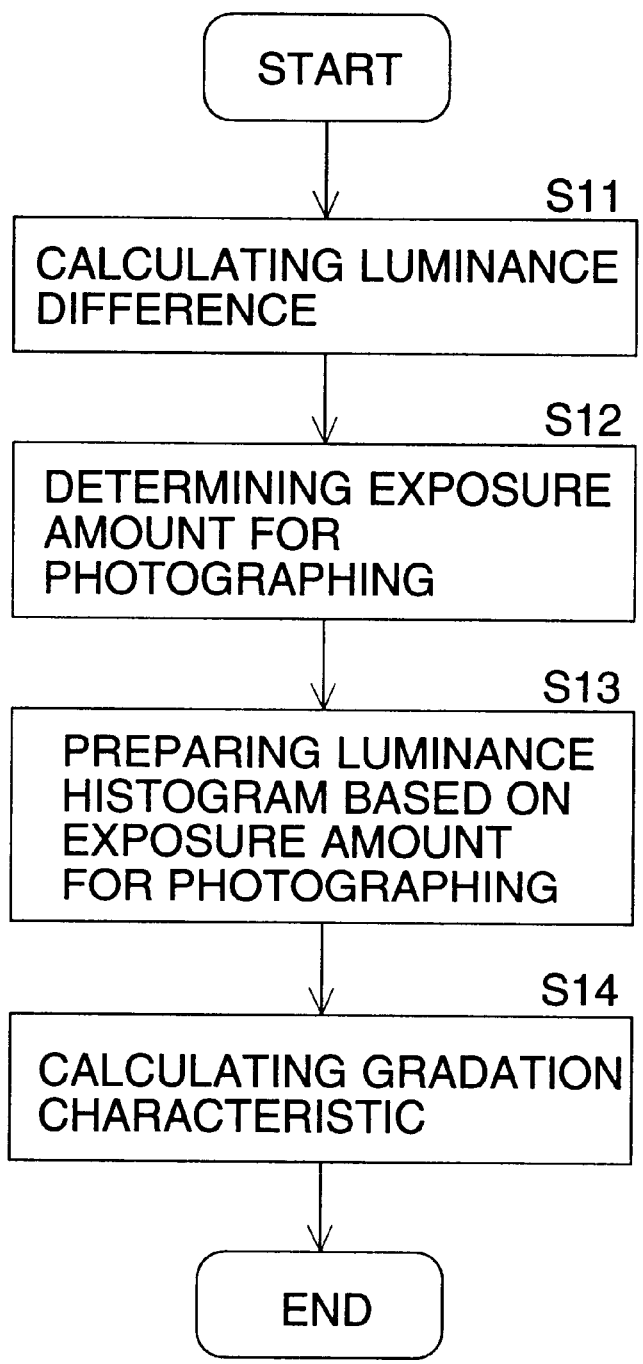
FIG. 4 is a flow chart showing a detailed processing for determining the gradation characteristic in the aforesaid embodiment.

The first embodiment will be explained with reference to a flow chart shown in FIG. 4.

In step 11, a width of distribution of luminance digital values is obtained. In the present embodiment, a difference between the maximum value and the minimum value in luminance digital values is obtained as a distribution width. However, the invention is not limited to this, and a difference between the luminance digital value which is away from the maximum value in the luminance digital values by 0%–10% in terms of frequency and the luminance digital value which is away from the minimum value by 0%–10% in terms of frequency, in a histogram, for example, can also be used as a width of distribution.

Figure 5:
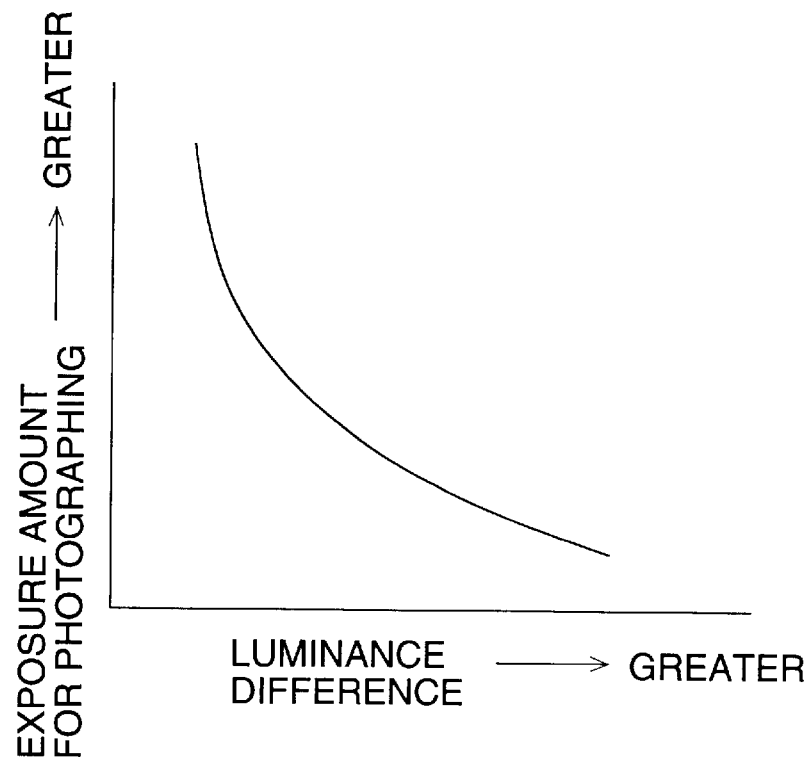
FIG. 5 is a map determining an exposure amount in photographing for a difference of luminance.
Figure 6:
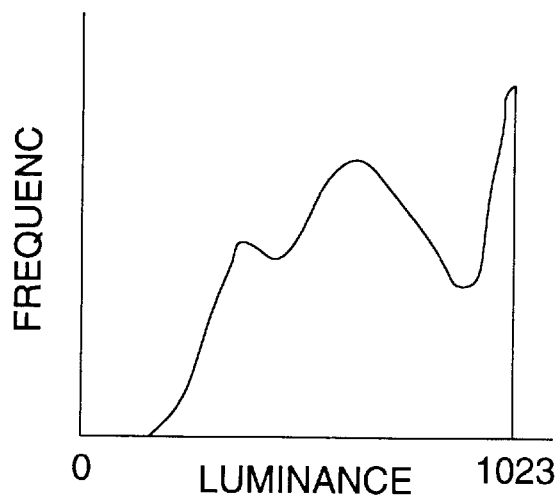
FIG. 6 is a luminance histogram in the case of a big difference of luminance under the condition of an exposure amount for preliminary photographing.
Figure 7:
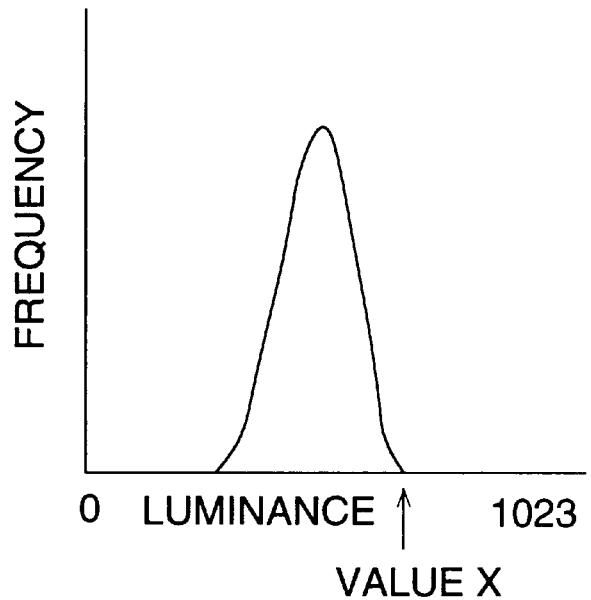
FIG. 7 is a luminance histogram in the case of a small difference of luminance under the condition of an amount for preliminary photographing.

In step 12, an exposure amount for photographing is determined based on the width of distribution of the luminance digital values mentioned above. To be concrete, a map of an exposure amount for photographing for the distribution width of luminance digital values shown in FIG. 5 is used for determination of the exposure amount for photographing. Namely, in the luminance histogram under the prescribed exposure amount condition in the preliminary photographing mentioned above, when the distribution width of luminance digital values is great as shown in FIG. 6, a size of the high luminance area is reduced by making the exposure amount to be smaller than the prescribed exposure amount because the high luminance area is saturated in many cases. When the distribution width of luminance digital values is small as shown in FIG. 7, an exposure amount for photographing is determined so that the contrast of the primary subject is raised by making the exposure amount to be greater than the prescribed exposure amount and thereby by expanding the distribution width of luminance digital values.

Figure 8:
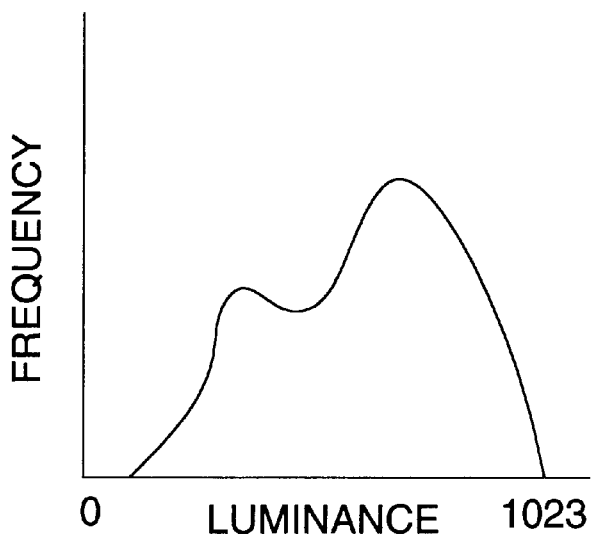
FIG. 8 is a luminance histogram under exposure amount conditions for photographing corresponding to FIG. 6 stated above.
Figure 9:
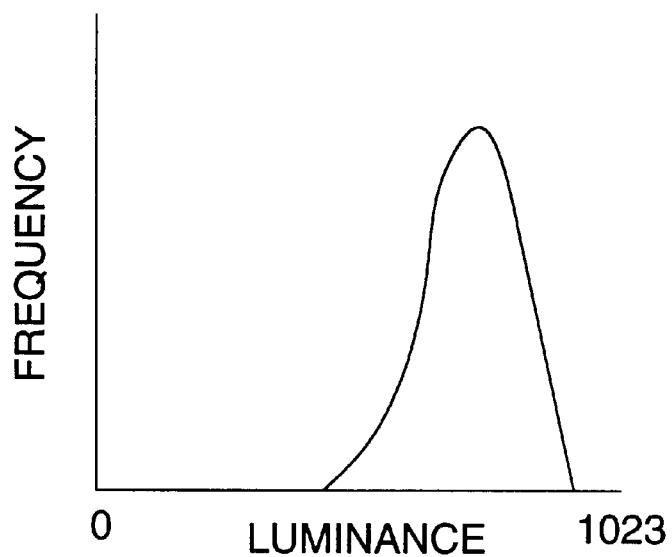
FIG. 9 is a luminance histogram under exposure amount conditions for photographing corresponding to FIG. 7 stated above.

In step 13, a luminance histogram at the exposure amount stated above is prepared based on the exposure amount for photographing determined in the previous step. In this case, the luminance histogram mentioned above can be obtained by calculating with the luminance histogram prepared in the step 1 based on the quantitative relation between the exposure amount for photographing determined newly and that for the preliminary photographing, namely on the ratio between them, for example, and thereby by estimating the luminance value of each pixel under the condition of the exposure amount for photographing. However, it is also possible to prepare the luminance histogram by conducting preliminary photographing (making a half-stroke of the shutter to be of a two-step type, for example) again under the condition of the exposure amount which is the same as that for the regular photographing determined in the step 12, and thereby by using the luminance data obtained in that preliminary photographing. In this case, when a difference between the maximum value and the minimum value for luminance in the preliminary photographing is great as shown in FIG. 5, the luminance histogram for small amount of exposure for photographing results in one shown in FIG. 8, which makes it possible to reduce frequency of the high luminance area, while when a difference between the maximum value and the minimum value for luminance in the preliminary photographing is small as shown in FIG. 7, the luminance histogram for large amount of exposure for photographing results in one shown in FIG. 9, and the difference between the maximum value and the minimum value of luminance is expanded, and the high luminance area is shifted to the higher luminance area side.

Figure 10:
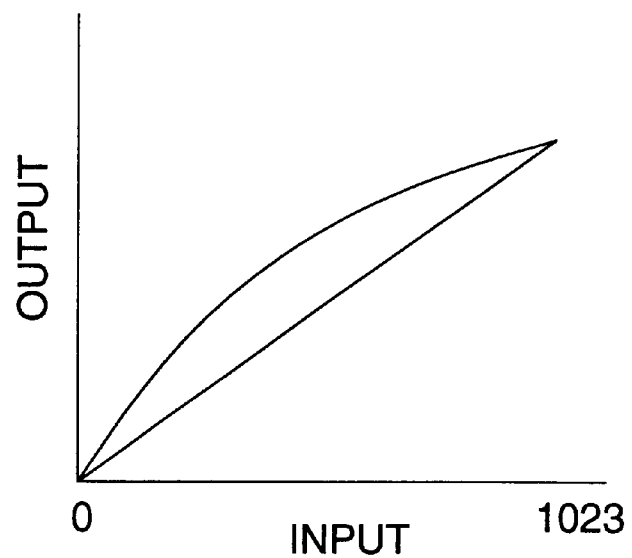
FIG. 10 is a diagram showing a gradation characteristic determined corresponding to FIG. 8.
Figure 11:
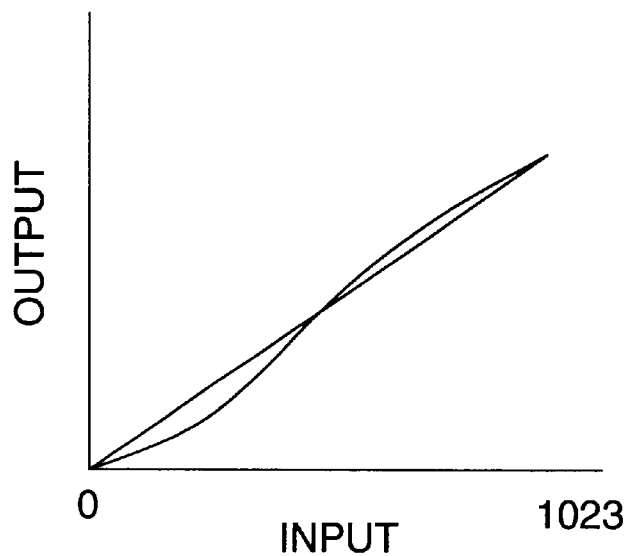
FIG. 11 is a diagram showing a gradation characteristic determined corresponding to FIG. 9.

In step 14, a gradation characteristic is determined based on the aforesaid new luminance distribution condition. To be concrete, a high luminance area is made to be hardly saturated with an 8-bit gradation characteristic representing a straight line or a curved line shown in FIG. 10 (corresponding to FIG. 8) and FIG. 11 (corresponding to FIG. 9). Namely, this straight line or the curved line is used to reduce saturation of the high luminance area. Further, when determining a gradation characteristic, it is possible to determine the gradation characteristic by making it to be correlated with an exposure amount for photographing so that the primary subject may be luminous appropriately. For example, it is possible to determine and correct the gradation characteristic so that an average luminance of the luminance area may be the standard luminance value, because it is most probable that the luminance area with high distribution frequency represents a primary subject in the aforesaid luminance histogram. An example of the average luminance includes "median" or "value of specific frequency in an accumulated histogram".

In the above-mentioned arrangement, a determination of appropriate exposure amount and a gradation characteristic reduces saturation of a high luminance area and prevents a white washout image, thus it is possible to obtain an appropriate signal-to-noise ratio and thereby to improve image quality. A noise amount is of two types including one that is proportional to signals and one that is a fixed amount. For the fixed amount noise, the greater the signal value is, the better the signal-to-noise ratio is. The signal value is increased by increasing exposure. This effect is produced especially on a low contrast image. In the case of a high contrast image, the signal-to-noise ratio is worsened in proportion to reduction of exposure, but a white washout image can be prevented.

Figure 12:
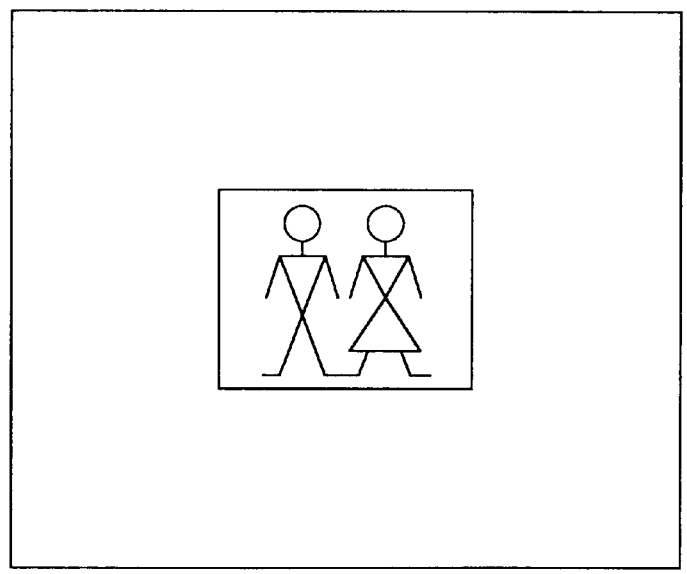
FIG. 12 is a diagram illustrating the occasion wherein a gradation characteristic is determined under the condition that an image central portion is an area where a primary subject exists.

For the primary subject which is photographed to be located at the central portion of an image in many cases, it is possible to make the primary subject to be appropriately luminous by calculating an average value of luminance in the central portion of an image under the condition of an exposure amount for photographing and by determining and correcting the gradation characteristic so that the average value may be the standard luminance value as shown in FIG. 12.

It is also possible to make an arrangement wherein an average luminance of the whole image is calculated as is conducted in ordinary AE, and an exposure amount and a gradation characteristic are determined to be correlated with each other so that the calculated average luminance may be the standard luminance. In the concrete arrangement adoptable, an exposure amount for photographing is determined first in the same way as in the foregoing, and a gradation characteristic of an area other than a high luminance area is determined so that an average luminance may be the standard luminance while determining a gradation characteristic of a high luminance area so that the high luminance area may be hardly saturated under the condition of the exposure amount determined previously.

The second embodiment will now be explained as follows.

In the embodiment, it is characterized that determination of a gradation characteristic which is different from that in the first embodiment is conducted when determining a gradation characteristic based on the luminance distribution condition in step 14 in the first embodiment. To be concrete, when a luminance difference or a contrast is small, an exposure amount is set to be slightly larger also in the present embodiment in the same way as in step 13 in the first embodiment. In this case, however, a gradation characteristic is determined to provide luminance which is higher than the standard, without converting to the standard luminance with a gradation characteristic.

Due to the arrangement mentioned above, when a subject is a reflecting object such as prints, it is possible to bring a white background of an original representing a subject close to white and thereby to obtain natural images.

Figure 13:
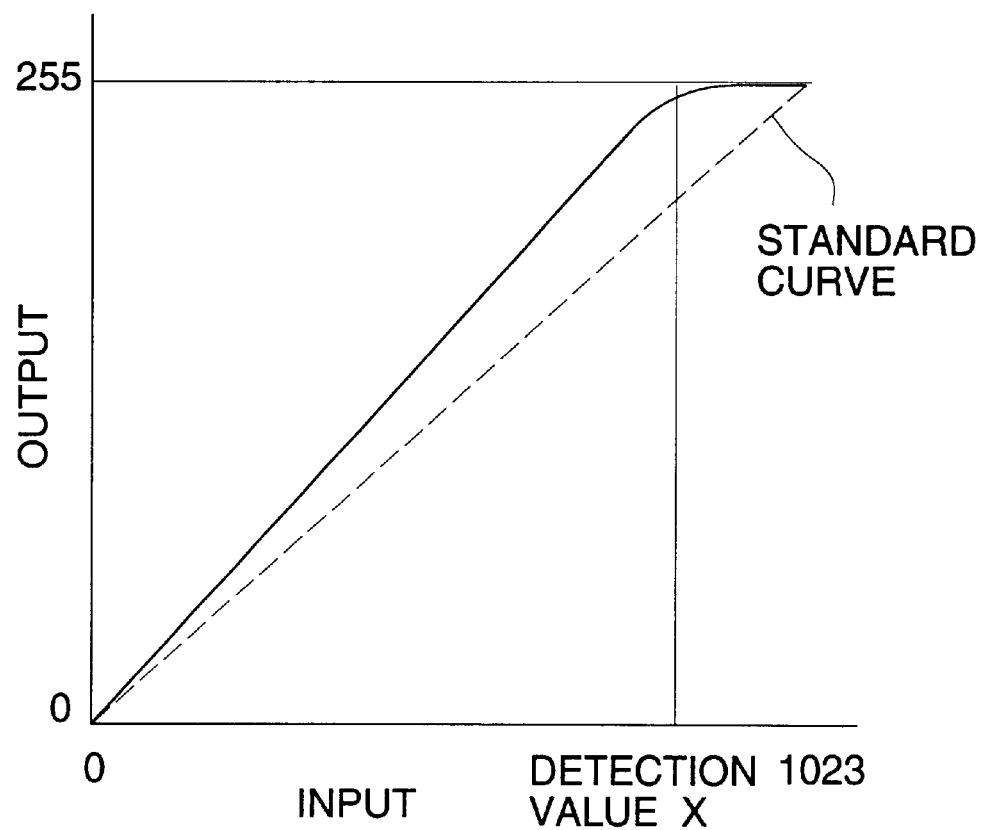
FIG. 13 is a diagram showing the gradation characteristic in the second embodiment.

Practically, maximum value X is first detected from image data having distribution of luminance digital values represented by a luminance histogram shown in FIG. 7. In this case, it is also possible to determine a detection position for the value X in advance within a frequency range of several percent from the maximum value. Then, a gradation characteristic curve is determined in a way that the value X thus obtained represents output which is almost maximum, as shown in FIG. 13.

To be practical, an inclination of the curve is steepened by changing gains in accordance with the following expression for the standard characteristic curve determined in advance.

Gain=1023/value $X$   Expression 1

Further, it is preferable to conduct smoothing processing (moving average) to smooth the gradation characteristic curve for the high luminance area and its vicinity. Namely, with regard to a gradation characteristic curve, the standard characteristic curve is established in advance, and in the case of the aforesaid prescribed conditions, a gradation characteristic curve is formed through gain adjustment and smoothing processing.

What is claimed is:

1. A method of controlling a camera, comprising the steps of:

obtaining first image signals from an image sensor by having said image sensor detect an image under a first exposure amount;

detecting luminance distribution condition of said first image signals;

setting a second exposure amount according to a luminance distribution of said luminance distribution condition;

determining a gradation characteristic according to said second exposure amount; and obtaining said second image signals according to said second exposure amount and said gradation characteristic;

wherein said setting step of said second exposure amount sets said second exposure amount larger than said first exposure amount when said luminance distribution is smaller than a predetermined value.

2. The method of claim 1, wherein said setting step of said second exposure amount sets:

said second exposure amount smaller than said first exposure amount when said luminance distribution is greater than another predetermined value.

3. The method of claim 2, wherein said luminance distribution condition is a histogram of a relationship between a luminance value and a frequency of said first image signals at given luminance value; and said luminance distribution is a difference or a ratio of a luminance value, corresponding to A % frequency of said first image signals from the ones at the maximum luminance value, to another luminance value, corresponding to B % frequency of said first image signals from the ones at the maximum luminance value; wherein A and B satisfy 90≦A≦100 and 0≦B≦10.

4. The method of claim 2, wherein said determining step of said gradation characteristic determines said gradation characteristic so that a gain of said gradation characteristic is larger than that of a standard gradation characteristic when said luminance distribution is smaller than a predetermined value.

5. The method of claim 2, wherein said determining step of said gradation characteristic determines a gain of said gradation characteristic according to a prescribed condition; and wherein said gain of said gradation characteristic according to a prescribed condition is one of: a first gain larger than that of a standard gradation characteristic when said luminance distribution is smaller than said predetermined value; or a second gain not more than that of said standard gradation characteristic when said luminance distribution is smaller than said predetermined value.

6. The method of claim 1, wherein said determining step of said second exposure amount and said gradation characteristic determines said second exposure amount and said gradation characteristic according to said luminance distribution condition so that an average luminance of luminous regions, each having distribution frequency higher than a predetermined frequency, of said image is set as a reference luminance of said second exposure amount and said gradation characteristic.

7. The method of claim 1, wherein said determining step of said second exposure amount and said gradation determines said second exposure amount and said gradation characteristic according to said luminance distribution condition so that a luminance of a center portion of said image is set as a reference luminance of said second exposure amount and said gradation characteristic.

8. The method of claim 1, wherein said determining step of said second exposure amount and said gradation determines said second exposure amount and said gradation characteristic according to said luminance distribution condition so that an average luminance of entire said image is set as a reference luminance of said second exposure amount and said gradation characteristic.

9. The method of claim 1, wherein said determining step of said second exposure amount and said gradation characteristic further comprising the steps of:

obtaining second image signals from said image sensor by having said image sensor detect said image with said second exposure amount;

detecting another luminance distribution condition of said second image signals;

determining said gradation characteristic according to said another luminance distribution condition.

10. A camera, comprising:

an exposure amount determining means for determining a first exposure amount of photographing;

an image sensor for converting image information to electric signals so a to obtain image signals;

a detection means for detecting a luminance distribution of said image signals;

said exposure amount determination means for determining a second exposure amount of photographing according to said luminance distribution; and a gradation characteristic determination means for determining a gradation characteristic of said image signals in relation to said second exposure amount of photographing;

wherein said exposure amount determining means determines said second exposure amount larger than said first exposure amount when said luminance distribution is smaller than a predetermined value.

11. The camera of claim 10, wherein said exposure amount determination means and said gradation characteristic determination means determine said second exposure amount and said gradation characteristic respectively according to said luminance distribution condition so that an average luminance of luminous regions, each having distribution frequency higher than a predetermined frequency, of said image is set as a reference luminance of said second exposure amount and said gradation characteristic.

12. The camera of claim 10, wherein said exposure amount determining means determines said second exposure amount smaller than said first exposure amount when said luminance distribution is greater than another predetermined value.

13. The camera of claim 12, wherein said luminance distribution condition is a histogram of a relationship between a luminance value and a frequency of said first image signals at given luminance value; and said luminance distribution is a difference or a ratio of a luminance value, corresponding to A % frequency of said first image signals from the ones at the maximum luminance value, to another luminance value, corresponding to B % frequency of said first image signals from the ones at the maximum luminance value; wherein A and B satisfy $90 \leq A \leq 100$ and $0 \leq B \leq 10$.

14. The camera of claim 12, wherein said gradation characteristic determines said gradation characteristic so that a gain of said gradation characteristic is larger than that of a standard gradation characteristic when said luminance distribution is smaller than a predetermined value.

15. The camera of claim 12, wherein said gradation characteristic determination means determines a gain of said gradation characteristic according to a prescribed condition; and wherein said gain of said gradation characteristic according to a prescribed condition is one of: a first gain larger than that of a standard gradation characteristic when said luminance distribution is smaller than said predetermined value; or a second gain not more than that of said standard gradation characteristic when said luminance distribution is smaller than said predetermined value.

16. The camera of claim 10, wherein said exposure amount determining means determines said second exposure amount and said gradation characteristic according to said luminance distribution condition so that a luminance of a center portion of said image is set as a reference luminance of said second exposure amount and said gradation characteristic.

17. The camera of claim 16, further comprising:

a control means for controlling said image sensor so as to output said image signals from said image sensor;

wherein said control means controls said image sensor so that said image sensor outputs first image signals according to a first exposure amount, and that said image sensor outputs second image signals according to a second exposure amount after said exposure amount determination means determines said second exposure amount wherein said second exposure amount is said exposure amount of photographing.

18. The camera of claim 10, wherein said exposure amount determining means determines said second exposure amount and said gradation characteristic according to said luminance distribution condition so that an average luminance of entire said image is set as a reference luminance of said second exposure amount and said gradation characteristic.

* * * * *

UNITED STATES PATENT AND TRADEMARK OFFICE
CERTIFICATE OF CORRECTION

| | | |
|---|---|---|
| PATENT NO. | : 6,583,820 B1 | Page 1 of 1 |
| APPLICATION NO. | : 09/039419 | |
| DATED | : June 24, 2003 | |
| INVENTOR(S) | : Hung | |

It is certified that error appears in the above-identified patent and that said Letters Patent is hereby corrected as shown below:

Item 54, Title "CONTROLLING METHOD AND APPARATUS FOR AN ELECTRONIC CAMERA", should read "--METHOD AND APPARATUS FOR CONTROLLING AN ELECTRONIC CAMERA BASED ON THE LUMINANCE DISTRIBUTION--.

Col. 9, line 51, "so a to obtain" should read -- so as to obtain--.

Signed and Sealed this

Twenty-fifth Day of July, 2006

JON W. DUDAS
*Director of the United States Patent and Trademark Office*